(12) United States Patent
Srivastava et al.

(10) Patent No.: US 12,301,895 B2
(45) Date of Patent: May 13, 2025

(54) SYSTEM AND METHOD OF DATA RECEIVER FRAMEWORK

(71) Applicant: JIO PLATFORMS LIMITED, Ahmedabad (IN)

(72) Inventors: Shikhar Srivastava, Bangalore (IN); Shivam Runthala, Navi Mumbai (IN); Raghuram Velega, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/028,546

(22) PCT Filed: Mar. 29, 2022

(86) PCT No.: PCT/IB2022/052874
§ 371 (c)(1),
(2) Date: Mar. 26, 2023

(87) PCT Pub. No.: WO2022/208336
PCT Pub. Date: Oct. 6, 2022

(65) Prior Publication Data
US 2023/0362459 A1    Nov. 9, 2023

(30) Foreign Application Priority Data
Mar. 30, 2021  (IN) .............................. 202121014379

(51) Int. Cl.
*H04N 21/23* (2011.01)
(52) U.S. Cl.
CPC .................................. *H04N 21/23* (2013.01)
(58) Field of Classification Search
CPC ...................................................... H04N 21/23
See application file for complete search history.

(56) References Cited

U.S. PATENT DOCUMENTS

| | | | |
|---|---|---|---|
| 10,360,193 B2 * | 7/2019 | Sarkar | G06F 16/219 |
| 10,656,627 B2 * | 5/2020 | Nixon | G05B 23/0264 |
| 11,294,941 B1 * | 4/2022 | Sammer | G06F 9/542 |
| 2014/0006338 A1 | 1/2014 | Watson et al. | |
| 2017/0102693 A1 | 4/2017 | Kidd et al. | |
| 2017/0235298 A1 | 8/2017 | Nixon et al. | |

FOREIGN PATENT DOCUMENTS

| | | |
|---|---|---|
| CN | 106933207 A | 7/2017 |
| CN | 105005274 B | 1/2019 |
| CN | 209858657 U | 12/2019 |
| WO | 2014005073 A1 | 1/2014 |

OTHER PUBLICATIONS

International Search Report, PCT/IB2022/052874, mailed Jun. 29, 2022, Total pp. 03.

* cited by examiner

*Primary Examiner* — Mulugeta Mengesha
(74) *Attorney, Agent, or Firm* — Raj S. Dave; Dave Law Group, LLC

(57) ABSTRACT

The present invention provides a robust and effective solution to an entity or an organization by providing a multi-threaded, fault tolerant, resilient, light weight and fast system (100) and method for an event streaming platform (108). The system and method may also enable capability to process data in micro-batch fashion by providing augmented and rich Event Streaming Platform through a data receiver module (110). The data receiver module (110) is a multi-processing system that facilitates a fast and reliable real time streaming of data feeds.

18 Claims, 8 Drawing Sheets

SYSTEM AND METHOD OF DATA RECEIVER FRAMEWORK

CROSS-REFERENCE TO RELATED APPLICATION(S)

This application is a National Stage of International Application No. PCT/IB2022/052874, filed on Mar. 29, 2022, which claims priority to Indian Patent Application number 202121014379, filed Mar. 30, 2021, the disclosures of which are hereby incorporated by reference in their entirety.

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to system and methods that facilitate event streaming. More particularly, the present disclosure relates to a system and method for facilitating real time event streaming in a multi-threaded and multi-processed system.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Event streaming is the practice of capturing data in real-time from event sources like databases, sensors, mobile devices, cloud services, and software applications in the form of streams of events; storing these event streams durably for later retrieval; manipulating, processing, and reacting to the event streams in real-time as well as retrospectively; and routing the event streams to different destination technologies as needed. Event streaming thus ensures a continuous flow and interpretation of data so that the right information is at the right place, at the right time. An Event Streaming Platform combines three key capabilities—to publish (write) and subscribe to (read) streams of events, to store streams of events durably and reliably for as long as you want and to process streams of events as they occur or retrospectively. One such Event Streaming Platform is Apache Kafka. Event Streaming Platform aims to provide a unified, high-throughput, low-latency platform for handling real-time data feeds. Event Streaming Platform stores key-value messages that come from arbitrarily many processes called producers. The data can be partitioned into different partitions within different topics. Other processes called consumers can read messages from partitions. Event Streaming Platform runs on a cluster of one or more servers (called brokers), and the partitions of all topics are distributed across the cluster nodes. Additionally, partitions are replicated to multiple brokers. This architecture allows Event Streaming Platforms to deliver massive streams of messages in a fault-tolerant fashion and has allowed it to replace some of the conventional messaging systems like Rabbit MQ, IBM MQ, Tibco Enterprise Message Service and Solace PubSub+. RabbitMQ is an open-source message-broker software (sometimes called message-oriented middleware) that originally implemented the Advanced Message Queuing Protocol (AMQP). The RabbitMQ server program is written in the Erlang programming language and is built on the Open Telecom Platform framework for clustering and failover. Client libraries to interface with the broker are available for all major programming languages. But, RabbitMQ is not good at handling the large amount of event data that is being generated by today's software systems as compared to the Event Streaming Platforms. IBM MQ is a family of message-oriented middleware products that IBM launched in December 1993. It was originally called MQSeries, and was renamed WebSphere MQ in 2002 to join the suite of WebSphere products. In April 2014, it was renamed IBM MQ. The products that are included in the MQ family are IBM MQ, IBM MQ Advanced, IBM MQ Appliance, IBM MQ for z/OS, and IBM MQ on IBM Cloud. MQ allows independent and potentially non-concurrent applications on a distributed system to securely communicate with each other, using messages. MQ is available on a large number of platforms (both IBM and non-IBM), including z/OS (mainframe), OS/400 (IBM iSystem or AS/400), Transaction Processing Facility, UNIX (AIX, HP-UX, Solaris), HP NonStop, OpenVMS, Linux, and Microsoft Windows. TIBCO Enterprise Message Service is a standards-based messaging platform built around supporting the JMS 1.1 and 2.0 standards. TIBCO Enterprise Message Service is fully TCK certified for both JMS 1.1 and 2.0. Solace PubSub+ is an event streaming and management platform. PubSub+helps enterprises design, deploy and manage event-driven architectures across hybrid cloud, multi-cloud and IoT environments, so they can be more integrated and event-driven.

Existing Consumer API that comes out of the box with Event Streaming Platforms has many limitations. To consume from an Event Streaming Platform one must write boiler plate code, and to create one it is necessary to have the knowledge of low-level system configurations. Moreover, extra processing needs to be done to make the consumer resilient. A pause/resume capability is a must to make the processing pipeline resilient to faults in case of infra failure, job failure or when we have to release a new patch to already deployed application logic. An Event Streaming Platform offers the following message delivery semantics for producer and consumer such as at most once—messages may be lost but are never redelivered, at least once—messages are never lost but may be redelivered and exactly once—each message is delivered once and only once. Ideally for any application, the exactly once semantic is sought. But this involves the need to store the offsets (internal message sequence number in a topic of Event Streaming Platform) for all the messages consumed from all the partitions of a topic, the information has to be stored outside of an Event Streaming Platform along with the processed message. For applications which processes data in micro batch fashion there is no provision to enable replay capability when restarting the application. The consumer processes are light weight and pretty fast once out of the box, but when the application logic is measured, the processing rate may fall behind the rate of message producer/publisher. Further, there is no micro-batch capability embedded in the default available consumer API. An Event Streaming Platform although may have a property for max poll, the broker and actual number of messages fetched may vary. Thus, the actual downstream processing may be expensive and require several messages to be clubbed and processed together. Furthermore, there is no multiprocessing support and multi-threading support out of the box, and one needs to run multiple instances of an application in order to achieve this. To consume and process the very large volume of data that is being generated by Telecom Industry, tools like SqlStream (by Guavus) and Spark Streaming were used in the past but proved to be inefficient incurring high cost. They were not successful in ingesting data efficiently into Big Data Eco-system due to such high volume and velocity.

There is therefore a need in the art to provide a system and a method that can overcome the shortcomings of the existing consumer system of an Event Streaming Platform.

OBJECTS OF THE PRESENT DISCLOSURE

Some of the objects of the present disclosure, which at least one embodiment herein satisfies are as listed herein below.

An object of the present disclosure is to provide for a system and method to facilitate ease of access and use of event streaming platform.

An object of the present disclosure is to provide for a system and method that enables fault tolerance and resiliency by having the capability to resume consuming from an Event Streaming Platform with at most loss of 1 micro-batch in case of failures.

An object of the present disclosure is to provide for a system and method that facilitates micro-batch processing functionality wherein an application is enabled to process uniform sized stream chunks.

An object of the present disclosure is to provide for a system and method that facilitates in increasing the overall throughput of the application in cases where the downstream sink might be expensive.

An object of the present disclosure is to provide for a system and method that facilitates fast and lightweight event streaming platforms.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present disclosure a system and method for facilitating receiving of a set of data packets of a big data eco-system by one or more first computing device. The method may include one or more processors coupled with a memory. The memory may store instructions which when executed by the one or more processors may cause the system to: receive, at a data receiver module, the set of data packets. The set of data packets may pertain to plurality of streams of real time data feeds from a plurality of big data sources associated with the one or more first computing devices. The processor may further cause the system to extract, by the data receiver module, a set of attributes from the set of data packets received, the set of attributes pertaining to the nature of data received; categorize, by the data receiver module, the set of data packets based on the set of attributes extracted; upon categorizing, store, by the data receiver module, the set of data packets durably and reliably into a plurality of threads such that the plurality of threads consume the set of data packets at a predefined throughput and wherein each thread may correspond to a specific first computing device. Furthermore, the processor may cause the system to pass, by the data receiver module, the stored set of data packets through a plurality of micro batches, each micro-batch corresponding to the specific thread.

The present disclosure further provides for a method for facilitating receiving of a set of data packets of a big data eco-system by one or more first computing device. The method may include the steps of receiving, at a data receiver module coupled to a processor, the set of data packets pertaining to data from a plurality of big data sources associated with the one or more first computing devices and extracting, by the data receiver module, a set of attributes from the set of data packets received, the set of attributes pertaining to the nature of data received. The method may further include the steps of categorizing, by the data receiver module, the set of data packets based on the set of attributes extracted. Upon categorizing, the method may further include the step of storing, by said data receiver module, the set of data packets durably and reliably into a plurality of threads such that the plurality of threads consuming, by the data receiver module the set of data packets at high throughput. Each thread may correspond to a specific first computing device. The method may also include the step of passing, by the data receiver module, the stored set of data packets through a plurality of micro batches, each micro-batch corresponding to the specific thread.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by providing a multi-threaded, fault tolerant, resilient, light weight and fast system and method for an event streaming platform. The system and method may also enable capability to process data in micro-batch fashion and may provide augmented and rich an Event Streaming Platform based processing.

Figure 1:
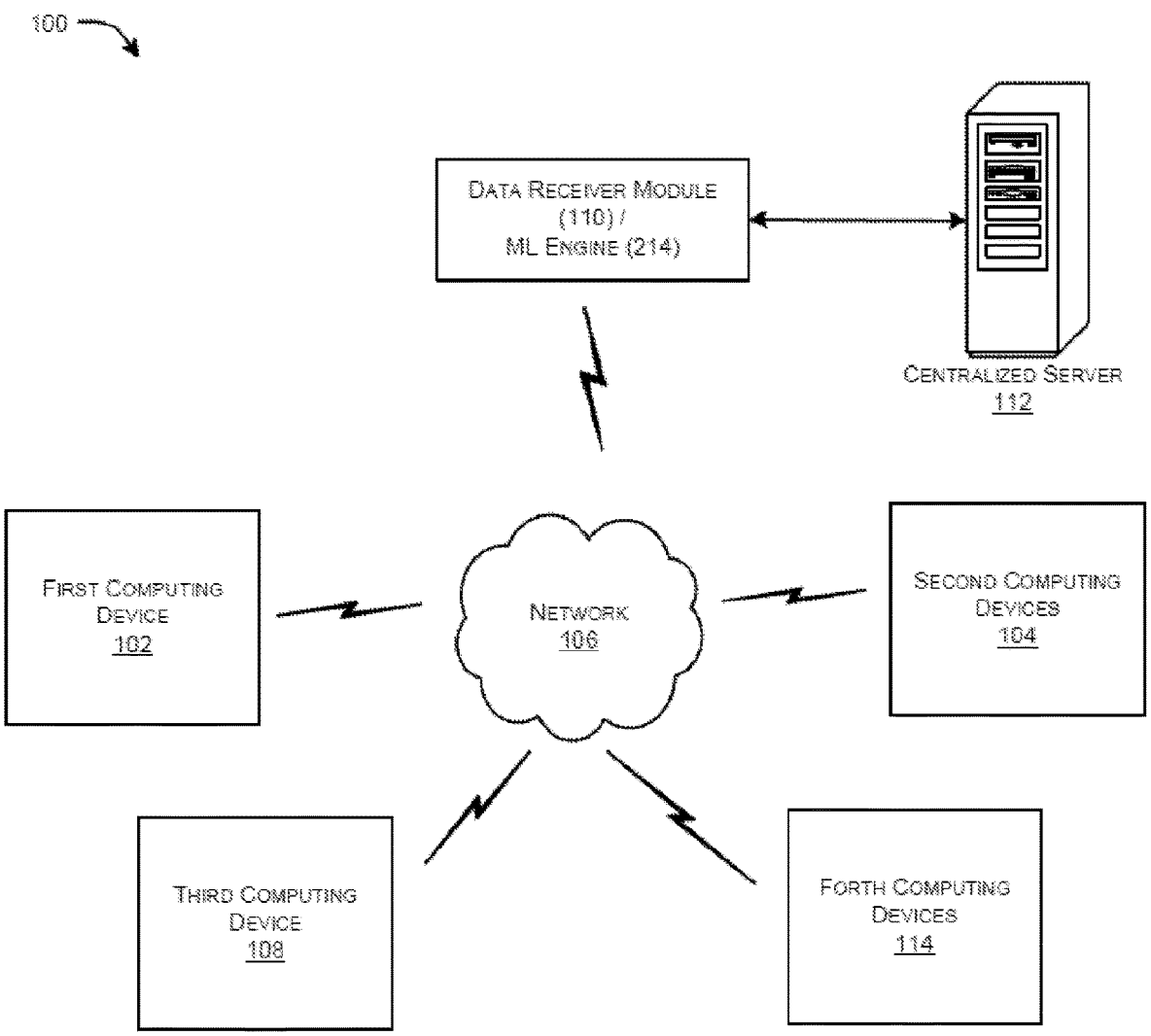
FIG. 1 that illustrates an exemplary network architecture in which or with which data receiver module of the present disclosure can be implemented, in accordance with an embodiment of the present disclosure.

Referring to FIG. 1 that illustrates an exemplary network architecture (100) in which or with which data receiver module (110) of the present disclosure can be implemented, in accordance with an embodiment of the present disclosure. As illustrated, the exemplary architecture (100) includes a data receiver module (110) equipped with a machine learning engine (214) (also referred to as data receiver module 110 hereinafter) for facilitating a unified, high-throughput, low-latency platform for handling real-time data feeds. The data receiver module (110) may be coupled to a centralized server (112). The data receiver module (110) may also be operatively coupled to one or more first computing devices (102), one or more second computing devices (104), a third computing device (108) and a fourth computing device (114). The one or more first computing devices (102) (also referred to as producers (102) may be configured to write a plurality of streams of real time data feeds from a plurality of big data source devices associated with the one or more first computing devices (102). For example, the big data sources can include internal documents of an entity, sensors, controllers, in house call centres, website logs, social media, official statistics, weather forecasts, publicly available data sets for data mining. The big data associated with the big data sources may include a log of records where each describes some event such as a purchase in a store, a web page view, a sensor value at a given moment, a comment on a social network, video frames and the like.

In an embodiment, the plurality of streams of real time data feeds may be further categorised into a plurality of sets of data packets (also referred to as data packets) by a third computing device (108) (also referred to as the event streaming platform (108)). Each set of data packets may correspond to a specific stream of real-time data and the categorization may be performed by the third computing device (108).

In an embodiment, the categorized data packets by the third computing device (108) may be read by the one or more second computing devices (104) (also referred to as consumers (104)).

In an embodiment, the data receiver module (110) may receive the categorized data packets from the consumers (104). The data receiver (110) may be further configured to store the received data packets durably and reliably into a plurality of threads such that the plurality of threads consume the data packets at a predefined throughput that may be greater than a predetermined threshold throughput. Each thread may correspond to a specific consumer (104) based on a predefined set of configuration details such as broker details, topics to read from, group ids, maximum poll records, consumers to spawn but not limited to the like. The data packets may be further passed through a plurality of micro batches, each micro-batch corresponding to a specific thread. The data receiver module (110) may further be configured to process the received set of data packets through a plurality of processing logic modules. For example, in Finance the system can help identify and measure market risks based on the categorization into micro-batches that makes analysis of customer behavior, industry benchmarks, product portfolio performance, interest rates history, commodity price changes, and the like easier.

In an embodiment, each micro batch may correspond to a set of messages. For example, micro batch cardinality may refer to a number of messages in the set and may define a threshold for the micro batch, with respect to, the number of messages the micro batch may include. The micro batch may allow fast data processing at at least a Peta Byte scale by clubbing together a plurality of messages/events and processing the plurality of messages/events together. Processing every event discretely may not be possible as overhead involved in setting up the processing stages may become too much to handle and may cause the underlying system to fail.

In an embodiment, at least three different types of timestamp associated with a message (or event) in a streaming data processing pipeline may be used. The at least three different types of timestamp may include an Event or Payload timestamp corresponding to a timestamp when the event occurred in the source system, an Ingestion timestamp corresponding to a timestamp when the event was ingested into the source system and a Processing timestamp corresponding to a current timestamp of the event processing system i.e. the system time on the host where the event processing pipelines may be running.

In an embodiment the thresholds for the micro batch may be defined with respect to the time duration (or age), of the messages the micro batch may include.

In an embodiment, the data receiver module (110) may be configured to update the database every time the data receiver module (110) may send the processed data packets to the fourth computing device (114) (also referred to as sink (114).

In an embodiment the data receiver module (110) upon execution of a set of instructions (also referred to as the application hereinafter) enable a plurality of users to customize the functionality of the data receiver module (110).

In an embodiment, the data receiver module (110) upon execution of the set of instructions, the data receiver module (110) may be resumed in case of failures to consume from the Event Streaming Platform (108) (or the one or more third computing devices (108)) with at most loss of but not limited to one micro-batch. The data receiver module (110) may process streaming and batch data packets and a combination thereof from the Event Streaming Platform (108).

In an embodiment, the data receiver module (110) may configure size of the plurality of micro-batches. The data receiver module (110) further may enable the set of instructions to process the plurality of micro-batches in uniform sized stream chunks, and the data receiver module (110) may wait until processing completes before proceeding to the next micro batch.

In an embodiment, the data receiver module (110) may spawn the set of data packets from the plurality of first computing devices (102) to the plurality of second computing devices (104) to achieve the predefined throughput with minimum resources and at a predefined rate.

In an embodiment, the data receiver module (110) may be configured to control a plurality of output files generated from the set of data packets received as inputs.

In an embodiment, the one or more first computing devices (102), the one or more second computing devices (104), the third computing device (108) and the fourth computing device (114) may communicate with the data receiver module (110) via set of executable instructions residing on any operating system, including but not limited to, Android™, iOS™, Kai OS™ and the like. In an embodiment, to one or more first computing devices (102), the one or more second computing devices (104), the third computing device (108) and the fourth computing device (114) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (102), the one or more second computing devices (104), the third computing device (108) and the fourth computing device (114) may not be restricted to the mentioned devices and various other devices may be used. A smart computing device may be one of the appropriate systems for storing data and other private/sensitive information.

In an embodiment, the data receiver module (110) or the centralized server (112) may include one or more processors coupled with a memory, wherein the memory may store instructions which when executed by the one or more processors may cause the system to access content stored in a network.

Figure 2A:
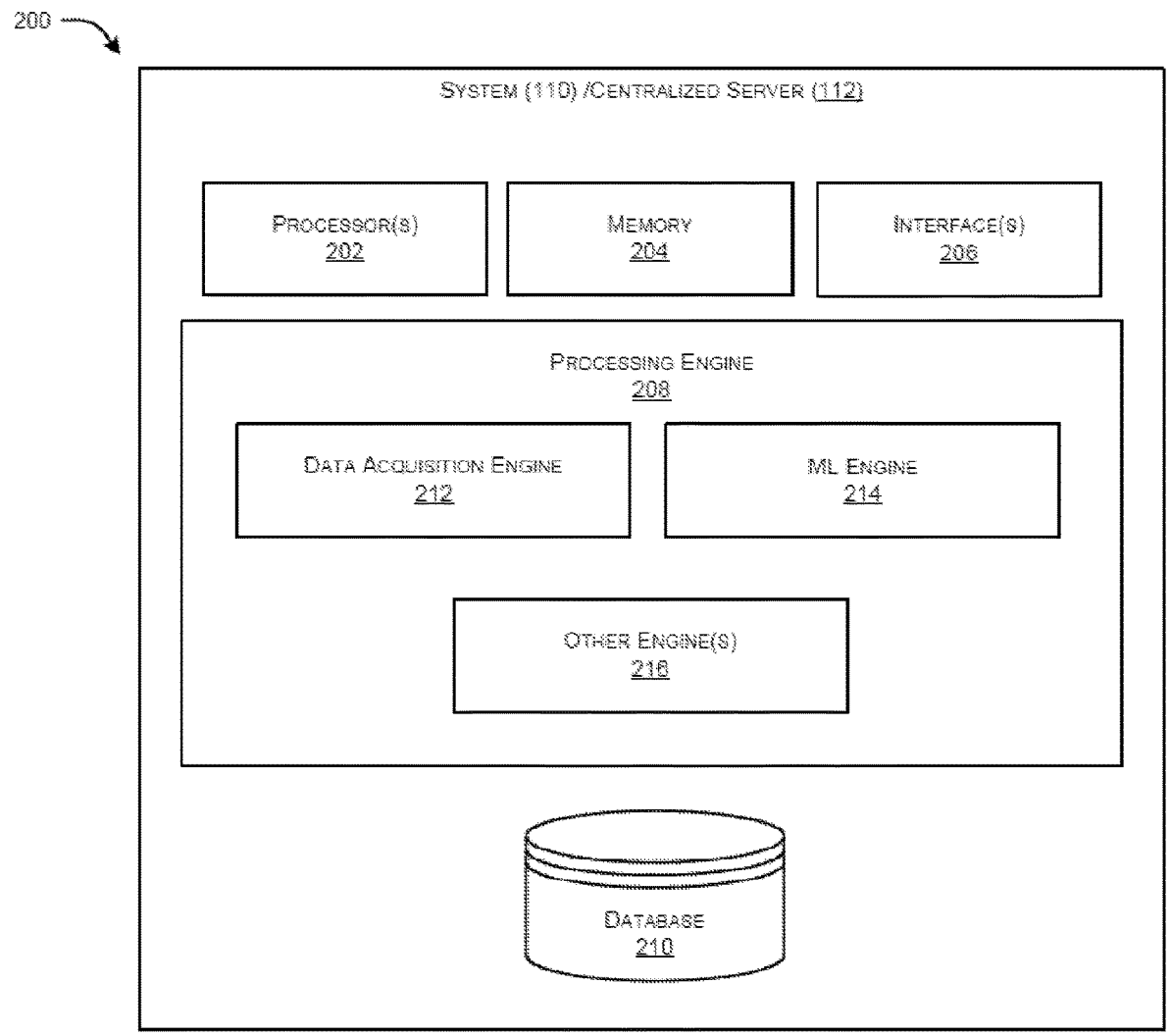
FIG. 2A illustrates an exemplary representation of data receiver module/centralized server for accessing content stored in a network, in accordance with an embodiment of the present disclosure.

FIG. 2A with reference to FIG. 1, illustrates an exemplary representation of data receiver module (110)/centralized server (112) for facilitating real time event data feeds, in accordance with an embodiment of the present disclosure. In an aspect, the data receiver module (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the data receiver module (110). The memory (204) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the data receiver module (110)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the data receiver module (110). The interface(s) 206 may also provide a communication pathway for one or more components of the data receiver module (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the data receiver module (110)/centralized server (112) may comprise the machine-readable storage medium storing the instructions and the processing resource to execute the instructions, or the machine-readable storage medium may be separate but accessible to the data receiver module (110)/centralized server (112) and the processing resource. In other examples, the processing engine(s) (208) may be implemented by electronic circuitry.

The processing engine (208) may include one or more engines selected from any of a data acquisition engine (212), a machine learning (ML) engine (214), and other engines (216).

Figure 2B:
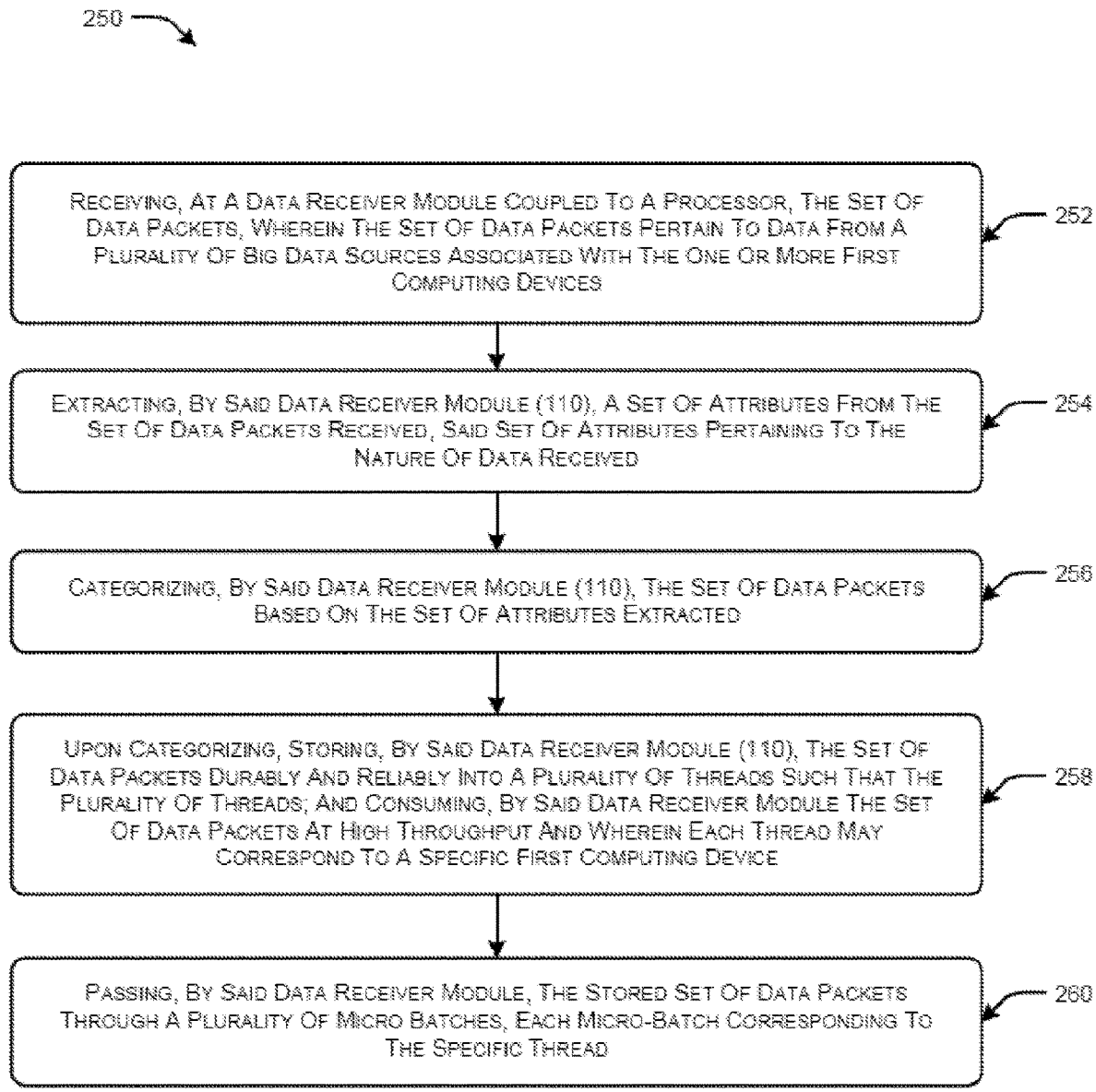
FIG. 2B illustrates an exemplary representation of a proposed method, in accordance with an embodiment of the present disclosure.

FIG. 2B illustrates an exemplary representation of a proposed method (250), in accordance with an embodiment of the present disclosure. As illustrated, the present disclosure further provides for a method (250) for facilitating receiving of a set of data packets of a big data eco-system by one or more first computing device. The method (250) may include at 252 the step of receiving, at a data receiver module coupled to a processor, the set of data packets pertaining to data from a plurality of big data sources associated with the one or more first computing devices and at 254, the step of extracting, by the data receiver module, a set of attributes from the set of data packets received, the set of attributes pertaining to the nature of data received.

The method (250) may further include at 256, the step of categorizing, by the data receiver module, the set of data packets based on the set of attributes extracted. Upon categorizing, the method (250) may further include at 258 the step of storing, by the data receiver module, the set of data packets durably and reliably into a plurality of threads such that the plurality of threads and consuming, by the data receiver module the set of data packets at high throughput. Each thread may correspond to a specific first computing device.

The method (250) may also include at 260, the step of passing, by the data receiver module, the stored set of data packets through a plurality of micro batches, each micro-batch corresponding to the specific thread.

Figure 3:
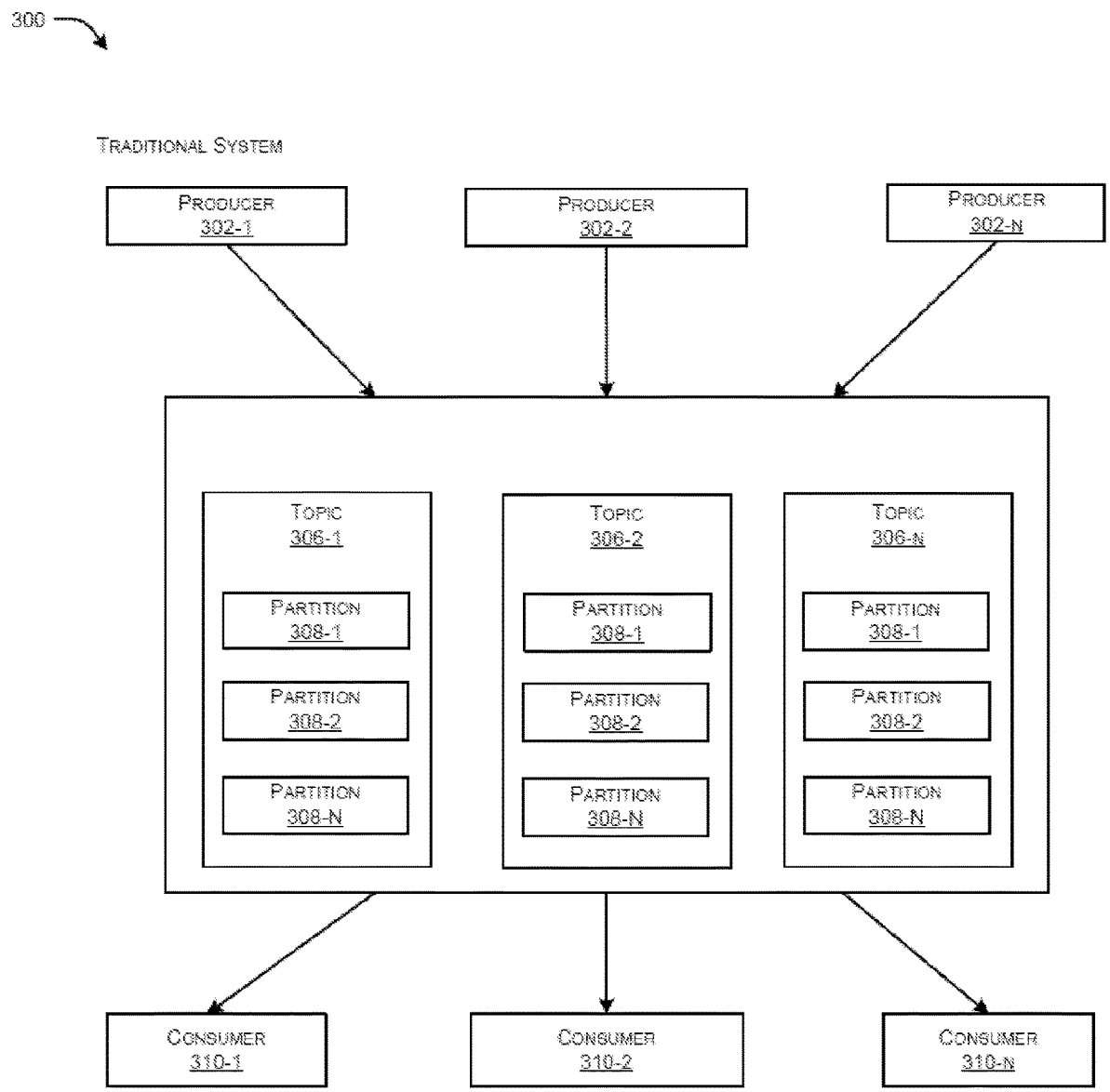
FIG. 3 illustrates an exemplary representation of a traditional system architecture for handling a plurality of real-time data streams, in accordance with an embodiment of the present disclosure.

FIG. 3 illustrates an exemplary representation of a traditional system architecture for handling a plurality of real-time data streams, in accordance with an embodiment of the present disclosure. As illustrated, the traditional system architecture (300) may include producers (302-1, 302-2, 302-3) that may be configured to permit an application to write/publish streams of record, consumers (310-1, 310-2, and 310-3) that may permit the application to subscribe/read to topics and process streams of records. The traditional system (300) may further include a messaging queue system (306) that may further include a plurality of topics (306-1. 306-2, 306-3). The plurality of topics may further include a plurality pf partitions (308-1, 308-2 . . . 308-$n$) where the plurality of real-time data streams may be stored and processed in an organised manner.

Figure 4:
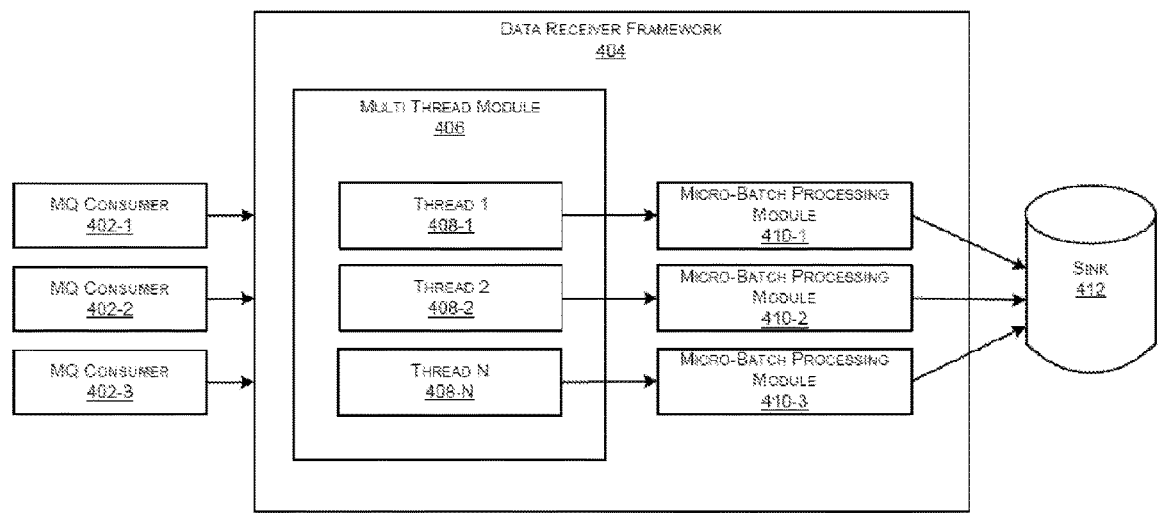
FIG. 4 illustrates an exemplary representation of the proposed system architecture for handling a plurality of real-time data streams, in accordance with an embodiment of the present disclosure.

FIG. 4 illustrates an exemplary representation of the proposed system architecture for handling a plurality of real-time data streams, in accordance with an embodiment of the present disclosure.

As illustrated, in an aspect, the proposed system may include one or more consumers (402-1, 402-2, and 402-3) that may permit the application to subscribe/read to topics and process streams of records. The streams of records may be then received by a data receiver module (also referred to as the data receiver framework (404)). The data receiver framework (404) may include a multi-threading module (406), a plurality of micro-batch processing modules (410). Each micro-batch processing module (410) may receive streams of records from a specific thread of the plurality of threads (408) included in the multi-threading module (406). The processed stream of records may be further provided to at least one sink (412).

Figure 5:
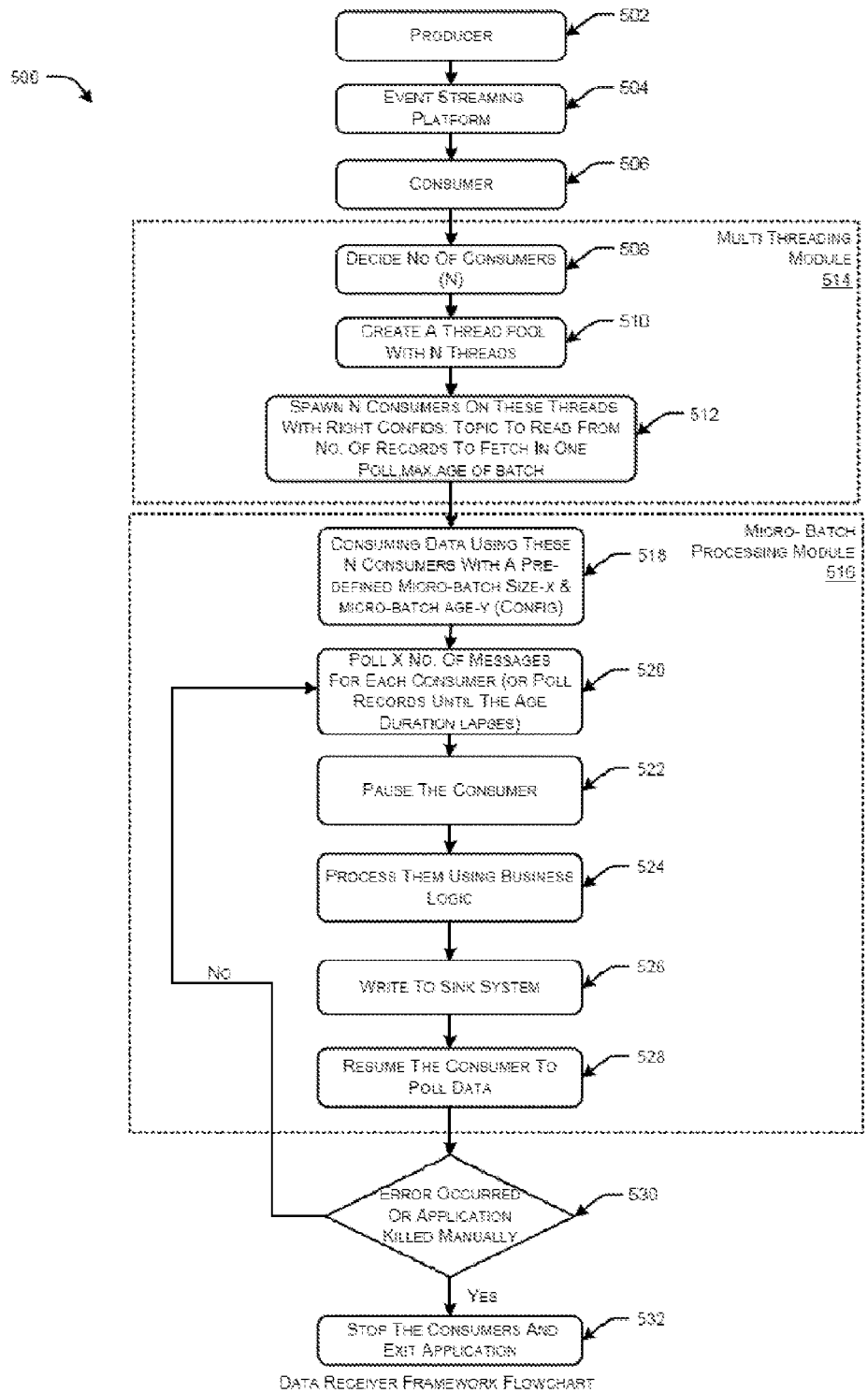
FIG. 5 illustrates an exemplary representation of a flow diagram of a data receiver framework method, in accordance with an embodiment of the present disclosure.

FIG. 5 illustrates an exemplary representation of a flow diagram of a data receiver framework method, in accordance with an embodiment of the present disclosure. As illustrated, in an aspect, the data receiver framework method (500) may include at block 502 a producer sending streams of records to an event streaming platform at block 504. The streams of records may be then read or subscribed by a consumer at block 506, where the streams of records may be received from the event streaming platform at block 504.

In an embodiment, the streams of record may be received by the multi-threading module at block 514 that may be configured to read a predefined set of configuration details such as broker details, topics to read from, group ids, maximum poll records, decide on how many consumers to spawn (n) but not limited to the like. Further, in an embodiment, the data receiver framework method at block 510 may include the step of creating a ThreadPool with n threads where n may pertain to number of consumers and n may be obtained from the step of deciding number of consumers (n) at block 508. Furthermore, in an embodiment, the data receiver framework method at block 510 may include the step of spawning n consumers on the n threads based on the predefined set of configuration details that may include information on the topic to read from and number of records to fetch in one poll.

Further, the data receiver framework method (500) may include a block 516 processing the stream of records by the micro-batch processing module where at block 518, the data receiver framework method (500) may include the step of consuming data from the n consumers with a pre-define micro batch size X and at block 520, the data receiver framework method (500) may include the step of polling the X number of messages for each consumer.

Furthermore, in an embodiment, at block 522, the data receiver framework method (500) may include the steps of pausing the consumer 508, processing the streams of records using predefined logic at block 524, writing to the sink system at block 526, resuming the consumer to poll data at block 528, If any error occurs at block 530, the consumer may be stopped and exited at block 532 or else polling the X number of messages for each consumer may be repeated and run in loop.

Figure 6:
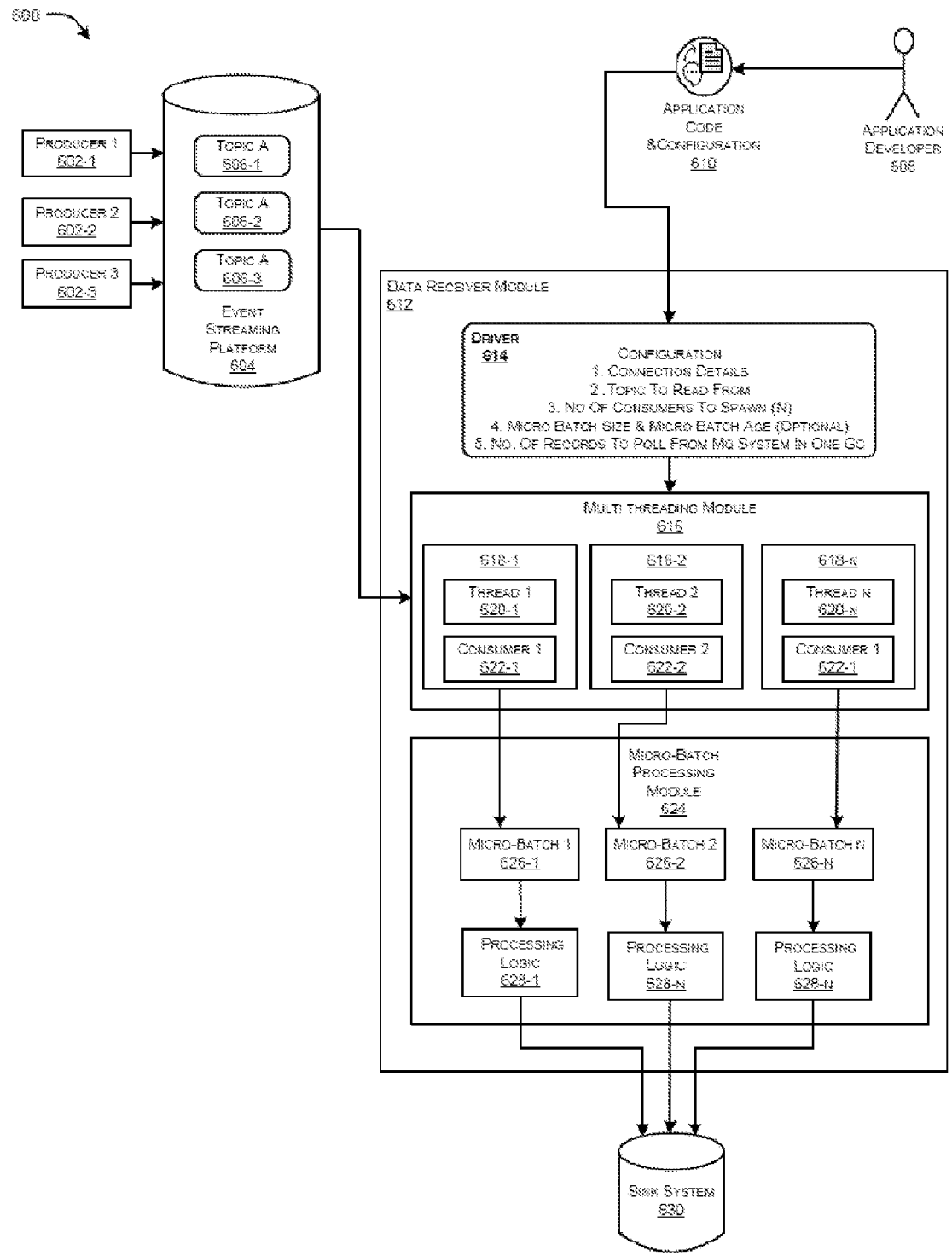
FIG. 6 illustrates an exemplary representation of a system architecture in accordance with an embodiment of the present disclosure.

FIG. 6 illustrates an exemplary representation of a system architecture in accordance with an embodiment of the present disclosure.

As illustrated in FIG. 6, in an aspect, one or more producers (602-1, 602-2, and 602-3) may send a stream of records to an event streaming platform 604. In an exemplary implementation, the stream of records from the producers (602-1, 602-2, and 602-3) pertaining to a Topic A may be received by a Topic A (606-1) module included in the event streaming platform (604). In another exemplary embodiment, the stream of records from the producers (602-1, 602-2, and 602-3) pertaining to a Topic B may be received by Topic B module (606-2) included in the event streaming platform (604). In yet another exemplary embodiment, the stream of records from the producers (602-1, 602-2, and 602-3) pertaining to a Topic C may be received by a Topic C module (606-3) included in the event streaming platform (604). The streams of records may be then received by a data receiver module (612). The data receiver module (612) may include a multi-threading module (616) and a micro-batch processing module (624). The multi-threading module (616) may include a plurality of threads (620-1, 620-2 . . . 620-$n$) corresponding to a plurality of consumers (622-1, 622-2 . . . 622-$n$). The micro-batch processing module (624) may include a plurality of micro-batch processing modules (626-1, 626-2 . . . 626-$n$). Each micro-batch processing module (626) may receive a plurality of streams of records from a specific thread of the plurality of threads (622) to be processed by a specific processing logic module (628) of a plurality of processing logic modules (628-1, 628-2 . . . 628-$n$) included in the micro-batch processing module (624). The processed stream of records from the plurality of processing logic modules (628) may be further provided to at least one sink (630).

In an exemplary implementation, data may be read from the Event Streaming Platform, the data may be processed in batch fashion and the data may be stored in a Big Data Eco-system but not limited to the like.

In an exemplary embodiment, the Big Data Eco-system may include a plurality of probes (interchangeably referred as probes) pertaining to real time event data feeds. The probes may include a network level information and may be captured whenever a call may be made on the network. A vendor may push the network data to an Event Streaming Platform.

In an exemplary implementation, data volume for the probes may be very high. 157 TB worth of data but not limited to it may be ingested every day for a few of telecom circles. Thus, the data volume pertaining to ingestion of data from at least 500 million customers pan India may be of size of 1.4 PB of data per day but not limited to it. In yet another exemplary embodiment, number of records per day may be at least 29.6 Billion but not limited to it, number of records per second may be at least 343.5 K but not limited to it, while per record size may be 5.7 KB but not limited to it. In an exemplary implementation, with at least three consumers, each processing at least 120 k records/second but not limited to it, at least 360 k records/second but not limited to it may be consumed and may be stored in a Hadoop Distributed File System (HDFS) but not limited to it. In yet another exemplary embodiment, resources used may include at least four cores but not limited to it and at least a memory of 20 GB but not limited to it.

In an exemplary embodiment, Fiber to the "x" (FTTX) data may correspond to an event-data of a plurality of devices such as a Set Top Box (STB), Optical Network Terminal (ONT) and the like. In another exemplary embodiment, the plurality of devices may publish data frequently to an event streaming platform, and consumers may consume the data from the event streaming platform and may ingest the data. In a way of example and not as a limitation, an STB may have at least 420.5 Million events per day but not limited to it, at least 292K events per hour but not limited to it. The resources used may be at least two cores but not limited to it and memory may be at least 10 GB but not limited to it. In another way of example and not as a limitation, an ONT may have at least 165.8 Million events per day but not limited to it, at least 115K events per hour but not limited to it. The resources used may be at least two cores but not limited to it and memory may be at least 10 GB but not limited to it.

In an embodiment, each micro batch may correspond to a set of messages. Batch cardinality may refer to a number of messages in the set and may define a threshold for the micro batch, with respect to, the number of messages the micro batch may include. The micro batch may allow fast data processing at least a Peta Byte scale by clubbing together a plurality of messages/events and processing the plurality of messages/events together. Processing every event discretely may not be possible as overhead involved in setting up the processing stages may become too much to handle and may cause the underlying system to fail.

In an embodiment, at least three different types of timestamp associated with a message (or event) in a streaming data processing pipeline may be used. The at least three different types of timestamp may include an Event or Payload timestamp corresponding to a timestamp when the event occurred in the source system, an Ingestion timestamp corresponding to a timestamp when the event was ingested into the source system and a Processing timestamp corresponding to a current timestamp of the event processing system i.e. the system time on the host where the event processing pipelines may be running.

In an embodiment the thresholds for the micro batch may be defined with respect to the time duration (or age), of the messages the micro batch may include.

In an embodiment, a Micro Batch Age based on processing time may be defined on a maximum age of the micro batch processing_duration and may define the maximum permissible limit to the time difference between the ingestion timestamp and the processing time. Thus mathematically, the processing_duration<=current_time−min(ingestion_timestamp). The processing duration may allow messages to be processed after every fixed duration irrespective of other thresholds being met or not, overriding all other settings and ensuring the stream processing may not stuck at any point of time.

In an embodiment, a Micro Batch Age based on Event Time may be given by a maximum event time duration for a micro batch and represented as event_duration in an example and not as a limitation. The Micro Batch Age based on Event Time may define the maximum permissible limit to the time difference between the event timestamps across the events that can belong to one micro batch. Thus mathematically, event_duration<=max (event_timestamp)−min (event_timestamp). The Micro Batch Age based on Event Time may allow effective batch strategy to be configured based on variations in the source data stream traffic with respect to time.

In an embodiment, a Micro Batch Age based on Ingestion Time may correspond to a maximum ingestion time duration for a micro batch and may be represented by ingestion_duration in an example and not as a limitation. The Micro Batch Age based on Ingestion Time may define the maximum permissible limit to the time difference between the ingestion timestamps across the events that can belong to one micro batch. Thus mathematically, ingestion_duration<=max (ingestion_timestamp)−min (ingestion_timestamp). The Micro Batch Age based on Ingestion Time may allow for timely processing of events where stream traffic remains more or less same with respect to time.

In an exemplary embodiment, a set of attributes to define a micro batch may include maximum batch age, maximum number of messages, maximum age event time, maximum age ingestion time, a combination thereof but not limited to the like to suit requirement and downstream processing.

Figure 7:
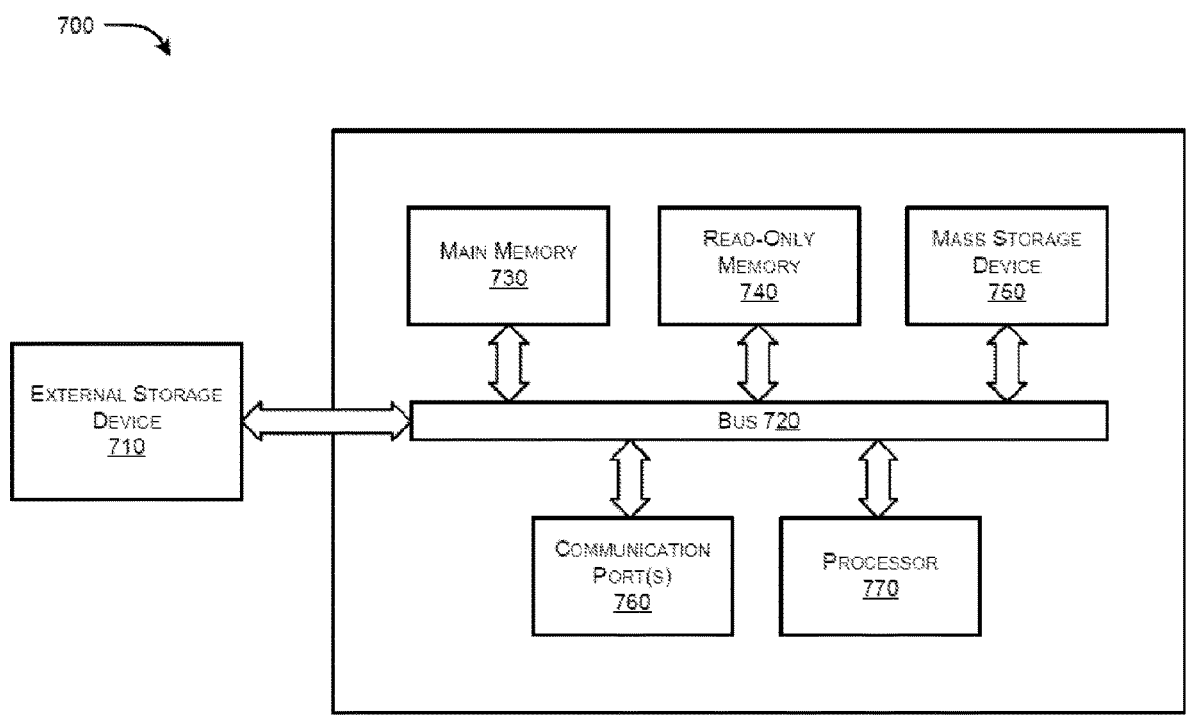
FIG. 7 illustrates an exemplary computer system in which or with which embodiments of the present invention can be utilized in accordance with embodiments of the present disclosure.

FIG. 7 illustrates an exemplary computer system in which or with which embodiments of the present invention can be utilized in accordance with embodiments of the present disclosure. As shown in FIG. 7, computer system 700 can include an external storage device 710, a bus 720, a main memory 730, a read only memory 740, a mass storage device 750, communication port 760, and a processor 770. A person skilled in the art will appreciate that the computer system may include more than one processor and communication ports. Examples of processor 770 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects. Memory 730 can be Random Access Memory (RAM), or any other dynamic storage device commonly known in the art. Read-only memory 740 can be any static storage device(s) e.g., but not limited to, a Programmable Read Only Memory (PROM) chips for storing static information e.g., start-up or BIOS instructions for processor 770. Mass storage 750 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 7K800), one or more optical discs, Redundant Array of Independent Disks (RAID) storage, e.g. an array of disks (e.g., SATA arrays).

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with a computer system. Other operator and administrative interfaces can be provided through network connections connected through communication port 760. The external storage device 710 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and method to facilitate a rich and robust consumer API that can be easily integrated into an application without writing any boiler plate code.

The present disclosure provides for a system and method to facilitate data to be processed in micro-batch fashion that helps reducing the cost in use cases downstream processing that may otherwise be expensive and require several messages to be clubbed and processed together.

The present disclosure provides for a system and method to facilitate multi-threading support to spawn multiple consumers without creating new instances of the application and helps in consuming data at very high speed with minimum possible resources.

The present disclosure provides for a system and method to facilitate to consumption of 120 k records/second but not limited to it.

The present disclosure provides for a system and method to facilitate recovering from the application failure and has pause resume capability to continue processing the data in micro-batch fashion.

We claim:

1. A system for facilitating receiving of a set of data packets of a big data eco-system by one or more first computing devices, the system comprising:
   one or more processors coupled with a memory, wherein said memory stores instructions which when executed by the one or more processors causes said system to:
   receive, at a data receiver module, the set of data packets, wherein the set of data packets pertain to data from a plurality of big data sources associated with the one or more first computing devices;
   extract, by said data receiver module, a set of attributes from the set of data packets received, said set of attributes pertaining to a nature of data received;
   categorize, by said data receiver module, the set of data packets based on the set of attributes extracted;
   upon categorizing, store, by said data receiver module, the set of data packets durably and reliably into a plurality of threads such that the plurality of threads consume, by said data receiver module, the set of data packets at a predefined throughput and wherein each thread may correspond to a specific first computing device; and
   pass, by said data receiver module, the stored set of data packets through a plurality of micro batches, each micro-batch corresponding to the specific thread.

2. The system as claimed in claim 1, wherein the data receiver module upon execution of a set of instructions enable a plurality of users to customize the functionality of the data receiver module.

3. The system as claimed in claim 1, wherein the data receiver module upon execution of the set of instructions, the data receiver module is resumed in case of failures to consume from an Event Streaming Platform with the one or more third computing devices with at most loss of one micro-batch.

4. The system as claimed in claim 1, wherein the data receiver module processes streaming and batch data packets and a combination thereof from an Event Streaming Platform associated.

5. The system as claimed in claim 1, wherein the data receiver module configures size of the plurality of micro-batches.

6. The system as claimed in claim 1, wherein the data receiver module enables the set of instructions to process the plurality of micro-batches in uniform sized stream chunks, wherein the data receiver module waits until processing completes before proceeding to a next micro batch.

7. The system as claimed in claim 1, wherein the data receiver module spawns the set of data packets from the plurality of first computing devices to a plurality of second computing devices to achieve a throughput with minimum resources and at a predefined rate.

8. The system as claimed in claim 1, wherein the data receiver module updates a database every time the data receiver module sends the processed set of data packets to a fourth computing device.

9. The system as claimed in claim 1, wherein the data receiver module is configured to control a plurality of output files generated from the set of data packets received as inputs.

10. A method for facilitating receiving of a set of data packets of a big data eco-system by one or more first computing devices, the method comprising:

receiving, at a data receiver module coupled to a processor, the set of data packets, wherein the set of data packets pertain to data from a plurality of big data sources associated with the one or more first computing devices;

extracting, by said data receiver module, a set of attributes from the set of data packets received, said set of attributes pertaining to a nature of data received;

categorizing, by said data receiver module, the set of data packets based on the set of attributes extracted;

upon categorizing, storing, by said data receiver module, the set of data packets durably and reliably into a plurality of threads such that the plurality of threads consuming, by said data receiver module the set of data packets at high throughput and wherein each thread may correspond to a specific first computing device; and, passing, by said data receiver module, the stored set of data packets through a plurality of micro batches, each micro-batch corresponding to the specific thread.

11. The method as claimed in claim 10, wherein upon execution of a set of instructions the method further comprises enabling a plurality of users to customize the functionality of the data receiver module.

12. The method as claimed in claim 10, wherein upon execution of the set of instructions, the method further comprises resuming the data receiver module in case of failures to consume from an Event Streaming Platform associated with the one or more first computing devices with at most loss of one micro-batch.

13. The method as claimed in claim 10, wherein the data receiver module the method further comprises processing streaming and batch data packets and a combination thereof from an Event Streaming Platform.

14. The method as claimed in claim 10, wherein the method further comprises configuring by the data receiver module size of the plurality of micro-batches.

15. The method as claimed in claim 10, wherein the method further comprises enabling by the data receiver module, the set of instructions to process the plurality of micro-batches in uniform sized stream chunks, wherein the data receiver module waits until processing completes before proceeding to a next micro batch.

16. The method as claimed in claim 10, wherein the method further comprises spawning by the data receiver module, the set of data packets from the plurality of first computing devices to a plurality of second computing devices to achieve a throughput with minimum resources and at a predefined rate.

17. The method as claimed in claim 10, wherein the method configures the data receiver module to update a database every time the data receiver module sends the processed set of data packets to a fourth computing device.

18. The method as claimed in claim 10, wherein the method further comprises controlling by the data receiver module a plurality of output files generated from the set of data packets received as inputs.

\* \* \* \* \*